United States Patent [19]
Uchida et al.

[11] Patent Number: 6,060,564

[45] Date of Patent: *May 9, 2000

[54] ACRYLONITRILE (CO)POLYMERIZATION WHILE REGULATING TEMPERATURE OF VAPOR PHASE

[75] Inventors: Mutsuko Uchida; Mune Iwamoto; Akihiko Nakajima; Masato Takaku; Hisato Morita; Koji Kawano, all of Osaka-fu, Japan

[73] Assignee: Mitsui Chemicals, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/574,682

[22] Filed: Dec. 19, 1995

[30] Foreign Application Priority Data

Dec. 26, 1994 [JP] Japan .................................. 6-322616

[51] Int. Cl.$^7$ ................. C08F 4/32; C08F 2/02; C08F 2/04

[52] U.S. Cl. ....................... 525/263; 525/244; 526/65; 526/88

[58] Field of Search ................... 525/244, 242, 525/263; 526/61, 66, 65, 88

[56] References Cited

U.S. PATENT DOCUMENTS

| | | | |
|---|---|---|---|
| 3,708,658 | 1/1973 | Hopkins | 364/172 |
| 3,919,354 | 11/1975 | Moore | 525/244 |
| 3,968,090 | 7/1976 | Shimada et al. | 526/88 |
| 3,981,944 | 9/1976 | Okamoto et al. | . |
| 4,125,574 | 11/1978 | Kastner et al. | 526/88 |
| 4,221,883 | 9/1980 | Mott | 525/243 |
| 4,551,510 | 11/1985 | Morris et al. | . |
| 4,677,171 | 6/1987 | Morris et al. | 526/68 |

FOREIGN PATENT DOCUMENTS

| | | |
|---|---|---|
| 0191877 | 8/1986 | European Pat. Off. . |
| 0400479 | 12/1990 | European Pat. Off. . |
| 0547718 | 6/1993 | European Pat. Off. . |
| 0700716 | 3/1996 | European Pat. Off. . |
| 0719801 | 7/1996 | European Pat. Off. . |
| 3430247 | 2/1986 | Germany . |
| 81015641 | 4/1981 | Japan . |
| 2088602 | 3/1990 | Japan . |

*Primary Examiner*—Christopher Henderson
*Attorney, Agent, or Firm*—Burns, Doane, Swecker, & Mathis, L.L.P.

[57] ABSTRACT

A process for the (co)polymerization of a monomer material, which includes at least an acrylonitrile monomer as an essential component, at a temperature of 80° C. or higher by bulk or solution polymerization while allowing said monomer material to evaporate. The (co)polymerization is conducted while providing a vapor phase over a polymerization mixture in a reaction tank. During the (co)polymerization, the temperature of the vapor phase is maintained in a range of from 30° C. to 65° C. so that the polymerization is conducted without substantially releasing vapor, which is evaporated from the polymerization mixture, to outside of the reaction tank. By cooling the vapor phase of the reaction tank and maintaining its temperature in the above specific range in accordance with the present invention, it is possible to avoid mixing of a gelled polymer in a product and also to effectively remove reaction heat at the time of the (co)polymerization.

8 Claims, No Drawings

ACRYLONITRILE (CO)POLYMERIZATION WHILE REGULATING TEMPERATURE OF VAPOR PHASE

BACKGROUND OF THE INVENTION a) Field of the Invention

This invention relates to a process for the production of an acrylonitrile (co)polymer without occurrence of adhesion of the (co)polymer on an inner wall of a reaction tank having a vapor phase and a liquid phase upon (co)polymerization of a monomer material, which includes an acrylonitrile monomer as an essential component, in the reaction tank and also to a polymerization reaction tank suitable for use in the practice of the production process.

b) Description of the Related Art

Production of a (co)polymer from a monomer material, which comprises at least an acrylonitrile monomer as an essential component, has been conventionally conducted by emulsion polymerization or suspension polymerization. These polymerization processes are however accompanied by serious problems from the standpoints of the global environment and product quality as they result in production of a great deal of waste water and mixing of an emulsifying or a suspending agent in products. There is hence an outstanding important demand for the development of a bulk or solution polymerization process.

However, neither bulk nor solution polymerization permits removal of heat by water as a medium. Use of a large reaction tank therefore raises a problem, that is, how to remove heat of polymerization reaction.

Upon (co)polymerization of a monomer material including at least an acrylonitrile monomer as an essential component, the (co)polymerization is generally conducted with a reaction tank fully filled up with a reaction mixture or in the presence of a vapor phase in the reaction tank.

When the (co)polymerization is conducted with the reaction tank fully filled with the reaction mixture, removal of heat has to be effected primarily relying upon conduction of heat through a tank wall so that, when the reaction tank becomes large, difficulty is encountered in removing heat. To achieve the above-mentioned removal of heat, it has therefore been the conventional practice to arrange coiled tubes of complex configurations within the reaction tank or to externally arrange a heat exchanger so that external recirculation of the polymerization mixture is performed to recirculate and cool it through the heat exchanger.

However, the (co)polymerization of said monomer material including at least one acrylonitrile monomer as an essential component is prone to adhesion of a gelled polymer on an inner surface of the reaction tank, whereby the use of the coil of the complex configurations or the heat exchanger for the provision of a sufficient heat-conducting area is disadvantageous in this respect. In particular, use of a reaction tank of a large capacity requires a greater area for the conduction of heat and more complex production facilities, thereby making the troublesome occurrence of a gelled polymer more serious.

When the capacity of a reaction tank is 1 m$^3$ or greater, especially over 3 m$^3$, it is advantageous to provide a vapor phase in an upper part so that heat of polymerization is controlled by allowing vapor to evaporate from a polymerization mixture, in other words, by so-called latent heat of evaporation. As the heat occurring through the polymerization is removed by the latent heat of evaporation, the reaction tank may be of a relatively simple construction. This easy removal of heat has also led to the merit that the size of the reaction tank can be enlarged.

However, in the case of inclusion of acrylonitrile as a vinyl monomer, especially copolymerization of styrene and acrylonitrile in the above-mentioned control method making use of latent heat of vaporization, a gaseous monomer mixture composed predominantly of acrylonitrile exists in a vapor phase, thereby involving another problem that a scale of a (co)polymer rich in acrylonitrile tends to deposit on a tank wall corresponding to the vapor phase. Gradually, this acrylonitile-rich (co)polymer scale is gelled and is rendered insoluble in a solvent. Portions of the scale dropping from the tank wall corresponding to the vapor phase into the polymerization mixture in the tank results in the serious problem that a resin obtained as a product is rendered impure. In particular, when the resulting copolymer is used as a film or sheet, inclusion of a polymer from the tank wall corresponding to the vapor phase has been a cause for formation of fish eyes. To remove a gel adhered on the reaction tank, the reactor has to be stopped frequently and a great deal of labor is needed. The formation of such a scale has created a serious problem for industrial production.

As a method for the prevention of formation of a polymer gel in a vapor phase, it has been proposed to coat a tank wall corresponding to the vapor phase with an anti-scaling agent. This method is however applicable only when a styrene and/or acrylonitrile monomer(s) is polymerized in an aqueous medium. In a process other than this, for example, in bulk polymerization or solution polymerization, the above-proposed method however involves the drawback that the anti-scaling agent is washed away by the monomer(s) and is not usable where a long-term continuous operation is desired.

Further, it has also been proposed in Japanese Patent Publication No. 15641/1981 (Mitsubishi Rayon) and U.S. Pat. No. 4,677,171 (Cosden Technology) to maintain the interior of a reaction tank at such a pressure so as to prevent evaporation of a polymerization mixture and to condense a gas over the polymerization mixture by a cooling device arranged inside or outside the reaction tank for the prevention of adhesion of a polymer on an inner wall of the reaction tank and the cooling device and also for the removal of heat of polymerization. However, this method requires pressurization of the interior of the reaction tank with an inert gas to maintain the polymerization mixture under a pressure preventing its evaporation, and raises a new problem that, due to the cooling of the vaporized polymerization mixture with the inert gas, the efficiency of heat conduction is deteriorated and the cooling device has to be very large.

It has also been proposed to prevent adhesion of a polymer inside a reaction tank by allowing a mercaptan of a low boiling point to exist in a vapor phase. This method however imposes limitations on operation conditions such as reaction temperature and reaction pressure. In addition, the mercaptan acts as a chain transfer agent and affects the reaction, for example, lowers the molecular weight of a polymerization product, resulting in a problem in the quality control of the product.

SUMMARY OF THE INVENTION

An object of the present invention is to provide an absolutely novel method for fully suppressing formation of an acrylonitrile-base gel in a vapor phase in continuous solution or bulk polymerization.

A more specific object of the presnt invention is to provide a process for efficiently (co)polymerizing a resin by preventing adhesion of scale on a reaction tank without coating an inner wall of the reaction tank with an anti-scaling agent or the like.

Another more specific object of the present invention is to provide a complete-mixing polymerization reaction tank suitable for use in the above-described polymerization process.

The present inventors proceeded with an investigation with a view to preventing adhesion of a gelled polymer on a polymerization tank wall due to formation of an acrylonitrile-rich polymer in (co)polymerization of a monomer material comprising at least an acrylonitrile monomer as an essential component. As a result, it has surprisingly been found that the above adhesion, which has remained as a serious problem to date, can be completely avoided by conducting the polymerization reaction in a reaction tank, which contains a vapor phase, while controlling the temperature of the vapor phase within a particular range, leading to the completion of the present invention.

In one aspect of the present invention, there is thus provided a process for the production of an acrylonitrile (co)polymer by bulk or solution (co)polymerization of a monomer material including at least an acrylonitrile monomer as an essential component optionally in the presence of a rubbery polymer, which comprises:

providing a vapor phase over said monomer material as a polymerization mixture in said reaction tank, and polymerizing said monomer material at a temperature of at least 80° C. while allowing said monomer material to evaporate; and proceeding with said (co)polymerization while externally cooling said reaction tank through a wall of said reaction tank to maintain said vapor phase at a temperature of from 30° C. to 65° C. to condense in said vapor phase vapor occurring from said reaction mixture.

In another aspect of the present invention, there is also provided a process for the production of an acrylonitrile (co)polymer by bulk or solution (co)polymerization of a monomer material including at least an acrylonitrile monomer as an essential component optionally in the presence of a rubbery polymer, which comprises:

providing a vapor phase over said monomer material as a polymerization mixture in said reaction tank, and polymerizing said monomer material at a temperature of at least 80° C. while allowing said monomer material to evaporate; and proceeding with said (co)polymerization without substantial extraction of vapor from said reaction mixture to outside of said reaction tank while externally cooling said reaction tank through a wall of said reaction tank to maintain said vapor phase at a temperature of from 30° C. to 65° C. to condense in said vapor phase vapor occurring from said reaction mixture.

In a further aspect of the present invention, there is also provided a complete-mixing polymerization reaction tank comprising:

a jacket divided into at least two parts comprising at least an upper jacket and a lower jacket, wherein of a wall surface of said reaction tank, the area of a wall surface covered by said upper jacket accounts for at least 20% of the area of a wall surface covered by said lower jacket. Preferably, the lower jacket is provided with heating means whereas the upper jacket is provided with cooling means.

DESCRIPTION OF THE INVENTION AND PREFERRED EMBODIMENTS

In the process of the present invention, the (co) polymerization is conducted at a temperature of 80° C. or higher. As removal of heat from the vapor phase is conducted preferably by means of a cooling medium through a jacket, a (co)polymerization temperature lower than 80° C. results in a small difference in the temperature from the cooling medium so that the conduction speed of heat is low. This is disadvantageous from the standpoint of conducting the operation while stably removing heat of polymerization. Further, when the polymerization temperature is 80° C. or lower, the viscosity of the polymerization mixture becomes higher in solution or bulk polymerization so that operation under stirring by stirring blades can hardly obtain an even temperature and cannot achieve any sufficient reaction velocity. To obtain a sufficient reaction velocity, an initiator is required in a large amount so that use of such a low polymerization temperature is economically disadvantageous. Insofar as the polymerization temperature is 80° C. or higher, no additional particular limitation is imposed. The polymerization can be conducted preferably at 85° C. or higher, more preferably at 90° C. or higher. Although no particular limitation is imposed on the upper limit of the polymerization temperature, the preferred upper limit can be 180° C. or lower with 160° C. or lower being preferred. A temperatures higher than 180° C. makes it difficult to maintain the temperature of the vapor phase at 65° C. or lower as defined in the present invention. In addition, such a high temperature generally leads to an extraordinarily high reaction velocity so that the operation tends to become unstable. In the present invention, the temperature control of the reaction tank uses a heat removal method which relies upon latent heat of vaporization. Accordingly, the reaction tank is not fully filled up with a liquid phase but contains a liquid phase in a lower part. An upper part is a vapor phase into which volatile components evaporate from the liquid phase. In general, the vapor so evaporated has the same temperature as the liquid phase which is in vapor-liquid equilibrium with the vapor phase. The temperature of the vapor phase in the vicinity of the liquid phase is substantially equal to the polymerization temperature. In the present invention, the temperature of the vapor phase is controlled at 30° C. to 65° C., preferably 30° C. to 55° C. If this temperature exceeds 65° C., adhesion of a polymer abruptly becomes severe. On the other hand, it is practically difficult to conduct the operation if the temperature of the vapor phase is 30° C. or lower.

The expression "the temperature of the vapor phase" as used herein means the temperature at a point at least 15 cm, preferably 50 cm down in the vertical direction from a vertically highest point on the inner wall of the reaction tank. The significance of this 15 cm is to measure not the temperature of the inner wall itself but the temperature of the vapor phase in the reaction tank.

According to another measure or standard, the position for the measurement of the temperature is a position about 5 to 40%, based on the height of the reaction tank, the way down from the highest point of the reaction tank In the present invention, it is preferred to measure the temperature of the vapor phase at a position which satisfies the above-described conditions and is remote from the wall of the reaction tank and the upper end plate to such an extent that the temperature of the vapor phase is not affected by the temperature of the jacket. Further, this temperature indicates the temperature of the vapor phase in the vicinity of the inner wall. The finding of important influence of the temperature in the vicinity of the inner wall to the formation of the adhesive substance has led to the present invention.

The control of the temperature of the vapor phase within the range of from 30° C. to 65° C. in the present invention can preferably be conducted by adjusting the temperature of the upper and lower jackets. Namely, an increase in the temperature of the lower jacket results in an increase in the temperature of the vapor phase. On the other hand, a decrease in the temperature of the lower jacket leads to a decrease in the temperature of the vapor phase. Further, by controlling the temperature of the cooling medium in the upper jacket to the range of from −10° C. to 35° C. makes it possible to control the temperature of the vapor phase within the above-described range. A temperature of the cooling medium in the upper jacket in a range of from 20 to 35° C. is preferred because this temperature makes it possible to easily control the temperature of the lower liquid phase. A temperature of the cooling medium in the upper jacket in a range of from −10 to 20° C. is also preferred because this temperature permits easy control of the temperature of the upper vapor phase. The flow rate of the cooling medium is required only to control the temperature of the vapor phase within the range of from 30° C. to 65° C., so that it can be easily determined by a person having ordinary skill in the art to which the present invention pertains.

The process of the present invention can achieve its object, for example, if the reaction tank is provided with two jackets, that is, a lower jacket for controlling its temperature and an upper jacket for controlling the vapor phase. If necessary, the jacket can be divided into three stages or more to control the temperature distribution. In the process of the present invention, it is preferred to control the temperature distribution so that the liquid level remains above the lower jacket.

According to the process of the present invention, vapor which has evaporated from the polymerization mixture is condensed into mist and is present in the form of cloud or the like in the vapor phase of the reaction tank. This state is observed especially in a reaction tank in which polymerization is actively under way. Such a state is preferred because the amount of gas taken out of the reaction tank becomes smaller when it is observed.

In the reaction tank according to the present invention, the liquid phase is provided with a feed line for polymerization raw material(s) and preferably, a feed pipe is arranged in the vapor phase inside the reaction tank. It is preferred to feed a monomer and/or a solvent through the feed pipe, and especially to spray in the form of mist. It is also preferred to arrange the feed pipe with its free end extending close to an upper end plate or a stirring shaft of the reaction tank. Further, it is also possible to arrange a disk as a dispersing plate above stirring blades and feed a monomer and/or a solvent to the disk so that the monomer and/or the solvent can be thrown against the wall of the reaction tank to wash the same.

As the monomer and/or solvent to be fed through the feed pipe, the same monomer and/or solvent as that employed as raw material(s) in the polymerization reaction is usable. Where a styrene monomer is included as a comonomer, use of the styrene monomer as a primary component is preferred.

The amount of this monomer feed and/or solvent can account for 3 to 30 wt. % of the total amount of raw materials fed to the reaction tank, with 3 to 20 wt. % being more preferred and 6 to 10 wt. % being particularly preferred. An amount greater than 30 wt. % impairs the mixing of the lower polymerization mixture and is questionable from the standpoint of safety of the polymerization operation.

The expression "feed through the main raw material feed line" as used herein means a feed through a line to supply 70 wt. % or more, preferably 80 wt. % or more of the whole raw materials to be fed to the reaction tank. Although not intended to impose any particular limitation, this line can be attached to the reaction tank, preferably with its feeding port being attached so that the raw materials can be fed directly from a bottom or side portion of the reaction tank into the lower polymerization mixture.

In the present invention, it is preferred to conduct the (co)polymerization without substantially extracting the vapor, which has evaporated from the lower polymerization mixture into the vapor phase, to an outside of the tank according to the present invention. Substantial extraction of the evaporated vapor to the outside of the reaction tank tends to cause adhesion. The expression "to conduct operation without substantially extracting the evaporated vapor to the outside of the reaction tank" as used herein means to limit the amount of vapor, which is to be extracted out of the reaction tank, to preferably 2% or less, more preferably 1% or less, and most preferably 0.5% or less.

However, extraction of vapor out of the reaction tank for a short time, for example, for 1 hour or shorter in an operation over 24 hours to cope with a change to conditions for the reaction tank or an abnormal increase in temperature is permitted in practicing the present invention and is included in the present invention.

The essential feature of the present invention is to conduct operation while controlling the temperature of the vapor phase within the range of from 30 to 65° C. For a substantial majority, preferably 80% or more, more preferably 90% or more of an overall operation time of (co)polymerization, the (co)polymerization must be conducted within the above-described temperature range. In the above-described non-steady operation, a limitation is therefore imposed on the time during which vapor is extracted out of the reaction tank.

In a reaction accompanied by a particularly large exotherm, the present invention does not prevent arrangement of a condenser outside the reaction tank to condense vapor extracted out of the reaction tank as long as condensation of vapor in the vapor phase of the reaction tank according to the present invention is fully achieved.

Of a wall surface of the reaction tank, the area of a wall surface covered by the upper jacket can account for 20% to 300%, preferably at least 30%, more preferably at least 50%, most preferably at least 80% of the area of a wall surface covered by the lower jacket, because in the present invention, the vapor evaporated from the lower polymerization mixture is condensed preferably by the upper jacket and the above-mentioned area of the wall surface covered by the upper jacket is needed for the condensation and cooling.

In the present invention, the temperature of a cooling medium in the upper jacket can be suitably selected insofar as the temperature of the upper vapor phase remains within the range specified according to the present invention. The temperature of the cooling medium can be in a range of from −10 to 35° C., preferably from 0 to 30° C., more preferably from 10 to 30° C.

In the (co)polymerization according to the present invention, the polymerization mixture can amount to 30 to 80%, preferably 40 to 70% of the whole capacity of the reaction tank.

Although the polymerization mixture in the present invention may contain water, the lower the water content, the better. The water content can be lower than 0.5%, notably 0.1% or lower. When water is mixed in a proportion of 0.5% or more, the temperature of the vapor phase fluctuates because the pressure of the vapor phase is affected by the vapor pressure of water. Such fluctuations in the temperature of the vapor phase are not preferred for the continuation of stable operation.

By controlling the temperature of the vapor phase in the reaction tank to the specific range as described above, the heat of reaction can be effectively removed and the adhesion of a gel on the wall of the reaction tank can be prevented.

Illustrative of the acrylonitrile monomer in the present invention include acrylonitrile, methacrylonitrile, ethacrylonitrile and phthalonitrile. Acrylonitrile or its mixture with one or more of the above-exemplified acrylonitrile monomers other than acrylonitrile can be used preferably.

Although it is essential for the process according to the present invention to include an acrylonitrile monomer, the process according to the present invention can also be applied preferably to copolymerization of such an acrylonitrile monomer with one or more other monomers. In particular, the process of the present invention can be used preferably for the production of a copolymer of an acrylonitrile monomer and a styrene monomer.

Usable examples of the styrene monomer in the present invention include styrene; α-alkylmonovinylidene aromatic monomers (for example, α-methylstyrene, α-ethylstyrene, α-methylvinyltoluene and α-methyldialkylstyrene); ring-substituted alkylstyrenes (for example, o-, m- and p-vinyltoluene, o-ethylstyrene, p-ethylstyrene, 2,4-dimethylstyrene and p-tert-butylstyrene); ring-substituted halostyrenes (for example, o-chlorostyrene, p-chlorostyrene, o-bromostyrene, and 2,4-dichlorostyrene); ring-alkyl, ring-halo-substituted styrenes (for example, 2-chloro-4-methylstyrene and 2,6-dichlorostyrene); vinylnaphthalene; and vinylanthracene. They can be used either singly or in combination. In general, alkyl substituent groups contain 1–4 carbon atoms and include isopropyl and isobutyl. These monovinylidene aromatic monomers can also be used either singly or in combination.

Although no particular limitation is imposed on the monomer copolymerizable with the acrylonitrile monomer and/or the styrene monomer, usable examples of the copolymerizable monomer include acrylates such as methyl methacrylate, acid anhydrides such as maleic anhydride, and maleimides such as N-phenylmaleimide and cyclohexylmaleimide.

Upon production of the copolymer in accordance with the process of the present invention, the acrylonitrile monomer can account preferably for 5–80 wt. %, more preferably for 5–60 wt. % and the styrene monomer may account preferably for 5–95 wt. %, more preferably for 20–95 wt, more preferably for 40–95 wt. %, all based on the whole monomers. Depending on the target copolymer, the acrylonitrile monomer and/or styrene monomer can be replaced preferably to 0–30 wt. %, more preferably to 0–15 wt. % based on the whole monomers by another monomer.

Where a rubbery polymer is needed in the present invention, no particular limitation is imposed on the rubbery polymer as long as rubbery properties are exhibited at room temperature. Preferred examples of the rubbery polymer include polybutadienes, which are polymers of conjugated 1,3-dienes (e.g., butadiene and isoprene); styrene-butadiene copolymers; and EPDM (ethylene-propylene-dienemethylene linkage).

Here, the rubbery polymer can be added and polymerized preferably in an amount of 4–50 parts by weight, more preferably in an amount of 4–20 parts by weight per 100 parts by weight of the whole monomers.

A solvent can be used in the process of the present invention. Examples of the solvent include benzene, toluene, xylene, ethylbenzene, acetone, isopropylbenzene and methyl ethyl ketone, with use of toluene or ethylbenzene being particularly preferred. The solvent can be used preferably in an amount of 5–50 parts by weight, more preferably in an amount of 10–30 parts by weight per 100 parts by weight of monomers employed.

Although an initiator is not absolutely needed in the process of the present invention, it is possible to use an initiator. Preferred examples of the initiator include t-butyl peroxypivalate, t-butyl peroxy(2-ethylhexanoate), and 1,1-bis(t-butylperoxy)-3,3,5-trimethylcyclohexane. The initiator can be used preferably in an amount of 0.001–5.0 parts by weight, more preferably in an amount of 0.001–3.5 parts by weight, most preferably in an amount of 0.001–2.0 parts by weight per 100 parts of monomers employed.

The jacket mounted on the reaction tank useful in the present invention is a device attached to the wall of the tank to externally heat or cool the contents of the reaction tank through the wall of the tank so that the temperature of the contents can be controlled. In general, the jacket provides on an outer side of the reaction tank a space through which a heat transfer medium can flow. In addition, the jacket can be in various forms depending on the application purpose.

The present invention will hereinafter be described in further detail by the following examples. It should however be borne in mind that the present invention is not limited by these examples. Quality evaluation was conducted by counting the number of fish eyes in accordance with the following standard.

Counting of fish eyes:

Each resultant product was extruded to a thickness of 1 mm, and the number of fish eyes as large as 0.2 $mm^2$ or greater per 5000 $cm^2$ in area was counted.

EXAMPLE 1

First and second complete-mixing polymerization reaction tanks employed in this example had a capacity of 80 l and were provided with two monomer feed pipes. In each reaction tank, an end of one of the monomer feed pipes was located at a position 10 mm apart from an end plate of the reaction tank while an end of the other monomer feed pipe was located at a position 20 mm apart from a stirring shaft (at a position about 20%, based on the height of the reaction tank, the way down from a top of the reaction tank). Further, the area of a wall area covered by an upper jacket accounted for 233% of the area of a wall area covered by a lower jacket. Copolymerization was conducted with each reaction tank filled with 38 l (47.5% of the whole capacity) of a polymerization mixture.

Into the first reaction tank, 74.5 parts by weight of styrene, 25.5 parts by weight of acrylonitrile, 25 parts by weight of ethylbenzene, 10 parts by weight of a rubbery polymer (a butadiene polymer, solution viscosity: 30 cst as measured at 25° C. in the form of a 5% styrene solution), 0.035 part by weight of an organic peroxide [1,1-bis(t-butylperoxy)-3,3,5-trimethylcyclohexane] and 0.15 part by weight of mercaptan were continuously fed as a raw material feed at 38 l/hr. At that time, the temperature of the lower jacket was controlled to set the polymerization temperature at 100° C. The temperature of a vapor phase was set at 52° C. Water of 30° C. was recirculated through the upper jacket, and the level of the polymerization mixture was controlled to be in contact at a height of 50 mm with the wall portion covered by the upper jacket.

Besides the feeding through the main raw material feed line, styrene monomer was additionally fed as mist in an amount of 5% of the whole raw material feed through the monomer feed pipe arranged in the vapor phase.

The internal pressure of the first reaction tank was controlled at a pressure of 0.64 kg/cm$^2$. The polymerization mixture so obtained was then fed to the second reaction tank to further proceed with the polymerization. The polymerization in the second reaction tank was conducted at an internal pressure of 1.2 kg/cm$^2$ and a polymerization pressure of 120° C. without feeding any monomer while recirculating water of 20° C. through the upper jacket so that the temperature of the vapor phase was maintained at 55° C. After a 6-month operation, the insides of the reaction tanks were checked. Adhesion of a gel was observed in neither the first reaction tank nor in the second reaction tank. Further, absolutely no fish eyes were observed in the product obtained at that time.

EXAMPLE 2

The reactor was operated under the same conditions as in Example 1 except that water of 10° C. was recirculated through the upper jacket of the first reaction tank. The temperature of the vapor phase arose to 35° C. According to an inspection conducted 6 months later, no gel was observed. Further, fish eyes were not observed at all in the product obtained at that time.

COMPARATIVE EXAMPLE 1

Copolymerization was conducted under the same conditions as in Example 1 except that warm water of 70° C. was recirculated through the upper jacket of the first reaction tank. The temperature of the vapor phase within the reaction tank arose to 82° C. After a one-week operation, a gel occurred inside the reaction tank. Further, 367 fish eyes were observed in the product obtained at that time.

COMPARATIVE EXAMPLE 2

Copolymerization was conducted under the same conditions as in Example 1 except that warm water of 40° C. was recirculated through the upper jacket of the first reaction tank. The temperature of the vapor phase within the reaction tank arose to 79° C. After a one-week operation, a gel occurred inside the reaction tank. Further, 132 fish eyes were observed in the product obtained at that time.

EXAMPLE 3

Copolymerization of styrene and acrylonitrile was conducted using a reaction tank having a capacity of 80 l and provided with two monomer feed pipes. In the reaction tank, an end of one of the monomer feed pipes was located at a position 10 mm apart from a top end plate of the reaction tank while an end of the other monomer feed pipe was located at a position 20 mm apart from a stirring shaft (at a position about 20%, based on the height of the reaction tank, the way down from a top of the reaction tank). Further, the area of a wall area covered by an upper jacket accounted for 233% of the area of a wall area covered by a lower jacket. Copolymerization was conducted with the reaction tank filled with 38 l (47.5% of the whole capacity) of a polymerization mixture.

Into the reaction tank, 60 parts by weight of styrene, 20 parts by weight of acrylonitrile, 20 parts by weight of ethylbenzene and 0.2 part by weight of mercaptan were continuously fed as a raw material feed at 38 l/hr. At that time, the temperature of the lower jacket was controlled to set the polymerization temperature at 140° C. The temperature of a vapor phase was set at 57° C. Water of 15° C. was recirculated through the upper jacket, and the level of the polymerization mixture was controlled to be in contact at a height of 50 mm with the wall portion covered by the upper jacket.

Besides the feeding through the main raw material feed line, styrene monomer was additionally fed as mist in an amount of 5% of the whole raw material feed through the monomer feed pipe arranged in the vapor phase.

The internal pressure of the reaction tank was controlled at a pressure of 0.43 kg/cm$^2$. After a 3-month operation, the inside of the reaction tank was checked. Adhesion of a gel was not observed in the reaction tank. Further, absolutely no fish eyes were observed in the product obtained at that time.

What we claim is:

1. A process for the production of an acrylonitrile copolymer by bulk or solution copolymerization of a monomer material including at least an acrylonitrile monomer as an essential component optionally in the presence of a rubbery polymer, which comprises:

providing a vapor phase over said monomer material as a polymerization mixture in said reaction tank, and polymerizing said monomer material at a temperature of at least 80° C. while allowing said monomer material to evaporate; and proceeding with said copolymerization while externally cooling said reaction tank through a wall of said reaction tank to maintain said vapor phase at a temperature of from 30° C. to 65° C. to condense in said vapor phase vapor occurring from said reaction mixture.

2. A process for the production of an acrylonitrile copolymer by bulk or solution copolymerization of a monomer material including at least an acrylonitrile monomer as an essential component optionally in the presence of a rubbery polymer, which comprises:

providing a vapor phase over said monomer material as a polymerization mixture in said reaction tank, and polymerizing said monomer material at a temperature of at least 80° C. while allowing said monomer material to evaporate; and proceeding with said copolymerization without substantial extraction of vapor from said reaction mixture to an outside of said reaction tank while externally cooling said reaction tank through a wall of said reaction tank to maintain said vapor phase at a temperature of from 30° C. to 65° C. to condense in said vapor phase vapor occurring from said reaction mixture.

3. The process according to claim 1, wherein said monomer material further comprises a styrene monomer as an additional component.

4. The process according to claim 1, wherein said reaction tank is externally provided with a jacket divided in an up-and-down relationship into at least two parts comprising an upper jacket and a lower jacket, said upper jacket is controlled lower in temperature than said lower jacket, a temperature of a cooling medium for said upper jacket is controlled in a range of from −10° C. to 35° C., and said polymerization mixture in said reaction tank is controlled in level so that the level of said polymerization mixture remains in contact with a portion of said wall of said reaction tank, said portion being covered by said upper jacket.

5. The process according to claim 1, wherein vapor which has occurred from said polymerization mixture exists as condensed mist in said vapor phase of said reaction tank.

6. The process according to claim 4, wherein of a wall surface of said reaction tank, the area of a wall surface covered by said upper jacket accounts for at least 20% of the area of a wall surface covered by said lower jacket.

7. The process according to claim 1, wherein a monomer and/or solvent feed pipe is arranged in the vapor phase of said reaction tank with a free end thereof extending close to a top end plate or a stirring shaft of said reaction tank, and a quantity of said monomer and/or solvent fed through said feed pipe is from 3 to 30 wt. % of that fed through a main material feed line.

8. The process according to claim 1, wherein the content of water in said polymerization mixture is lower than 0.5 wt. %.

\* \* \* \* \*

UNITED STATES PATENT AND TRADEMARK OFFICE
CERTIFICATE OF CORRECTION

PATENT NO. : 6,060,564
DATED : May 9, 2000
INVENTOR(S) : Mutsuko UCHIDA et al.

It is certified that error appears in the above-identified patent and that said Letters Patent is hereby corrected as shown below:

Section [75], fifth named inventor, please change "Hisato Morita" to --Hisao Morita--.

Signed and Sealed this

Fifteenth Day of May, 2001

Attest:

NICHOLAS P. GODICI

Attesting Officer    Acting Director of the United States Patent and Trademark Office